(12) United States Patent
Rhee et al.

(10) Patent No.: US 8,518,530 B2
(45) Date of Patent: Aug. 27, 2013

(54) PRODUCTION METHOD FOR AN ULTRA-LOW-DIELECTRIC-CONSTANT FILM, AND AN ULTRA-LOW-DIELECTRIC-CONSTANT FILM PRODUCED THEREBY

(75) Inventors: Hee-Woo Rhee, Seoul (KR); Hyun Sang Choi, Seoul (KR); Seong-Gyu Min, Seoul (KR); Bum Suk Kim, Seoul (KR); Bo ra Shin, Seoul (KR)

(73) Assignee: Industry-University Cooperation Foundation Sogang University, Seoul (KR)

( * ) Notice: Subject to any disclaimer, the term of this patent is extended or adjusted under 35 U.S.C. 154(b) by 130 days.

(21) Appl. No.: 13/321,734

(22) PCT Filed: Feb. 19, 2010

(86) PCT No.: PCT/KR2010/001044
§ 371 (c)(1),
(2), (4) Date: Nov. 21, 2011

(87) PCT Pub. No.: WO2010/134684
PCT Pub. Date: Nov. 25, 2010

(65) Prior Publication Data
US 2012/0064330 A1   Mar. 15, 2012

(30) Foreign Application Priority Data
May 20, 2009   (KR) .................. 10-2009-0044060

(51) Int. Cl.
*B32B 3/26*   (2006.01)
*B32B 27/28*   (2006.01)
*B05D 5/12*   (2006.01)
*C08J 7/04*   (2006.01)
*C07F 7/18*   (2006.01)
*C09D 183/04*   (2006.01)

(52) U.S. Cl.
USPC ............ 428/304.4; 556/444; 521/86; 427/77; 427/515; 428/447

(58) Field of Classification Search
None
See application file for complete search history.

(56) References Cited

U.S. PATENT DOCUMENTS 6,271,273 B1 * 8/2001 You et al. .................. 521/61
6,451,712 B1 * 9/2002 Dalton et al. ............... 438/781

(Continued)

FOREIGN PATENT DOCUMENTS

| KR | 10-2002-0079075 A | 10/2002 |
| KR | 10-0455339 B1 | 11/2004 |
| KR | 10-0508696 B1 | 8/2005 |
| KR | 10-0589123 B1 | 6/2006 |
| KR | 10-0595526 B1 | 7/2006 |
| KR | 10-0672905 B1 | 1/2007 |

OTHER PUBLICATIONS

The International Search Report dated Oct. 18, 2010.

*Primary Examiner* — Robert S Loewe
(74) *Attorney, Agent, or Firm* — McClure, Qualey & Rodack, LLP

(57) ABSTRACT

The present invention relates to a production method for an ultra-low-dielectric-constant film, in which ratios are optimised in a mixed solution having a matrix consisting of a poly (alkyl silsesquioxane) copolymer and a porogen represented by Chemical formula 1, and in which this mixed solution is subjected to ultraviolet curing during a heat treatment. The ultra-low-dieletric-constant film of the present invention can be used as an intermediate insulating film for next generation semiconductors instead of the SiO2 dielectric films currently used, since pores of from 1 to 3 nm are uniformly distributed at from 10 to 30% and a very high degree of mechanical elasticity of from 10.5 to 19 GPa is achieved at a low dielectric constant from 2.12 to 2.4.

18 Claims, 3 Drawing Sheets

(56) References Cited

U.S. PATENT DOCUMENTS

| | | | |
|---|---|---|---|
| 7,169,477 B2* | 1/2007 | Lyu et al. | 428/447 |
| 2004/0109950 A1* | 6/2004 | Adams et al. | 427/387 |
| 2006/0014845 A1* | 1/2006 | Ree et al. | 521/154 |
| 2006/0142504 A1* | 6/2006 | Ree et al. | 525/342 |
| 2009/0146265 A1* | 6/2009 | Nguyen et al. | 257/632 |
| 2011/0101489 A1* | 5/2011 | Edelstein et al. | 257/506 |
| 2012/0328796 A1* | 12/2012 | Gates et al. | 427/551 |

* cited by examiner

Decomposition of Si-CH₃ Bonds $Si-CH_3 + Si-OH \longrightarrow Si-O-Si + CH_4$ $Si-CH_3 \longrightarrow Si-H$ $Si-H + Si-OH \longrightarrow Si-O-Si + H_2$

Condensation Reaction $Si-OH + Si-OH \xrightarrow{heat} Si-O-Si + H_2O$ $Si-OH + Si-OH \xrightarrow{UV\ irradiation} Si-O-Si + H_2O$

PRODUCTION METHOD FOR AN ULTRA-LOW-DIELECTRIC-CONSTANT FILM, AND AN ULTRA-LOW-DIELECTRIC-CONSTANT FILM PRODUCED THEREBY

CROSS REFERENCE TO RELATED APPLICATION

This application is the 35 U.S.C. §371 national stage of PCT application PCT/KR2010/001044, filed Feb. 19, 2010, which claims priority to and the benefit of Korean Patent Application No. 10-2009-0044060, filed on May 20, 2009, both of which are hereby incorporated by reference in their entirety.

TECHNICAL FIELD

The present invention relates to a method of preparing an ultralow dielectric film and an ultralow dielectric film thereof, and more particularly, to a method of preparing an ultralow dielectric film having a high mechanical strength while permittivity thereof is maintained at 2.4 or less and an ultralow dielectric film thereof.

BACKGROUND OF THE INVENTION

As the demand for high speed and high integration of a semiconductor device increases, a trend in a line width of a semiconductor shows a rapid decrease. However, a decrease in line width in an ultra large scale integrated circuit semiconductor device leads to an increase in RC delay, which is the result of capacitance (C) between metal wirings and resistance (R) of the wiring metal, thereby decreasing the operating speed of the device. In order to address this issue, there were efforts to replace aluminum as a conventional wiring metal with a material having lower resistivity than that of aluminum, and resistance problems of the wiring metal were resolved when IBM produced a microprocessor using copper as a wiring material in 1997. As for the capacitance, a silicon oxide film, which was conventionally used as an insulator, has permittivity of about 4.0, however, interference between wirings could not be prevented due to an increase in capacitance as the line width decreased. As a result, the development of an interlayer dielectric material that addresses this issue has been actively pursued.

For this interlayer dielectric material to be applied to actual semiconductor processes, a number of integration characteristics besides low permittivity should all be satisfied. Required properties appropriate for a process, such as electrical isotropy for wiring design and process facilitation, low reactivity with a metal wiring material, low ion transferability, chemical mechanical polishing (CMP), etc., should all be satisfied.

For a copper wiring process related to thermal characteristics to maintain thermal stability at a temperature up to 400° C. and facilitate heat emission during the operation of a device, thermal conductivity approximating to that of a silicon oxide film (12.0 mW/cm° C.) should be required including a low thermal expansion coefficient (<10 ppm/° C.), which may inhibit the change of the film according to a change in temperature. Further, low leakage current and high breakdown voltage are required as electrical properties. In addition, various stresses which may occur at the interface with another material, adhesion which minimizes peeling, crack resistance, etc., should be satisfied and hygroscopic property, which leads to an increase in permittivity, should be low. In addition, compatibility in the unit process, such as polishing processability, should be maintained when the CMP process is performed with at an appropriate strength. Among these characteristics, in relation to compatibility with the mechanical polishing process such as CMP process, the development of an ultralow dielectric film, which may withstand the process and maintain a high elastic modulus of 5 to 6 GPa or more, has been an issue. When pores are introduced in order to reduce permittivity in conventional ultralow dielectric films, a low mechanical strength of less than 5 GPa is exhibited and thus attempts to overcome this have been actively performed.

Research and Development and commercialization by Dow Chemical, Applied Materials, Rohm&Haas, JSR Micro, ASM, Allied Signal, etc., are continuously developing an ultralow dielectric material.

Among the above stated companies, Dow Chemical Company has been continuously developing SiLK™ film for the past few years, which the coefficient of thermal expansion (CTE) of the film exceeds 50 ppm/° C. in addition to its mechanical strength. Subsequently, IBM has actually stopped the application of the film during processes. Even though IBM stopped the process application due to a CTE issue of SiLK™, Dow Chemical Company has continued the development of the SiLK series while improving the CTE. Recently, Dow Chemical Company has developed a porous SiLK™, called SilK Y resin having a pore size of about 1.8 nm and permittivity of 2.2. However, since porous SiLK™ has an elastic modulus of 3.0 GPa, which is generally low and the CTE of the film is still as high as 40 ppm/° C., it is unclear whether the film can be applied to actual processes [Silk Semiconductor Dielectric Resins, (http://www.dow.com/silk)]. Although, it is known that Fujitsu, Sony, and Toshiba from Japan mass produce the resin by using the SiLK™ thin film, and these companies are adopting a hybrid structure of CVD and SOD films during the integration thereof. Most of the other companies have developed low dielectric materials by changing the structure of the raw material into a material based on methylsilsesquioxane (MSQ), and most of the rotation coating type low permittivity materials developed by Rohm and Haas, JSR Micro, Allied Signal, etc., have an elastic modulus of 3 GPa in the range of 2.1 to 2.3 as the minimum permittivity.

Black Diamond from Applied Materials, which is a material with a carbon doped oxide (CDO) structure previously mentioned, and Aurora RULK having permittivity of 2.6 to 2.7, are produced by chemical vapor deposition (CVD), and both of them have an elastic modulus of about 8 GPa [Nanotechnology Forum 2005]. In Korea, Samsung Advanced Institute of Technology prepared an ultralow dielectric film by using a cyclodextrin having an alkyl group or an acetyl group at the terminal thereof, and LG Chemical Ltd., prepared an organic silicate matrix to prepare a nanoporous organic silicate. However, presently, there has been rarely any study on low permittivity materials.

With respect to this, the present inventors prepared a chemical reaction type pore-forming resin by using an organic cyclic polyol and an organic non-cyclic polyol, which can also use the resin to prepare an ultralow dielectric film having excellent mechanical properties as the pore content of the resin increases, unlike conventional nonreactive porogens, for example, polycaprolactone, Tetronics, methyl cyclodextrin, etc. [Korean Patent No. 589123, Korean Patent No. 595526, and Korean Patent No. 672905].

However, there still exists a need for an ultralow dielectric film having significantly improved mechanical strength and permittivity, while being able to substitute as a SiO₂ dielectric film currently being used and is available for the next generation semiconductor.

SUMMARY OF THE INVENTION

The present invention has been made in an effort to provide an ultralow dielectric film including nanopores having very low permittivity and excellent mechanical strength.

The present invention has been made in an effort to provide an ultralow dielectric film including closed pores with a nano size, which are uniformly distributed.

An exemplary embodiment of the present invention provides a method of preparing an ultralow dielectric film, the method including: putting a compound represented by the following Formula 1 and a poly alkyl silsesquioxane copolymer into an organic solvent to prepare a mixed solution and then coating the mixed solution on a substrate to form a thin film; heating the thin film to 200 to 300° C.; and subjecting the thin film to heat treatment after raising the thin film to 350 to 500° C. and irradiating an ultraviolet (UV) ray at a wavelength of 200 to 300 nm to the thin film for 5 to 30 min during the heat treatment.

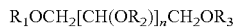

$R_1OCH_2[CH(OR_2)]_nCH_2OR_3$            [Formula 1]

In the formula, $R_1$, $R_2$, and $R_3$ are each hydrogen or A, and one or more of $R_1$, $R_2$, and $R_3$ are A, wherein, A is $R_4Si(OR_5)_3$, $R_4$ and $R_5$ are each an alkyl group of a carbon number of 1 to 5, and n is an integer of 2 to 4.

Another exemplary embodiment of the present invention provides an ultralow dielectric film including pores in a matrix, wherein a poly alkyl silsesquioxane copolymer is used as the matrix of the ultralow dielectric film and the pores are formed by coating a mixed solution of a compound represented by Formula 1 and the poly alkyl silsesquioxane on a substrate and then subjecting the substrate to heat treatment to remove an organic material from the compound of Formula 1.

An ultralow dielectric film prepared by the present invention may provide very low permittivity while securing a mechanical strength necessary for the low dielectric film. More specifically, the ultralow dielectric film may be used as an interlayer insulating film for next generation semiconductors instead of the SiO₂ dielectric films currently used, since pores from 1 to 3 nm are uniformly distributed from 10 to 30% and a very high degree of mechanical elasticity from 10.5 to 19 GPa is achieved with low permittivity from 2.12 to 2.4.

DETAILED DESCRIPTION OF THE EMBODIMENTS

Figures 1, 2:
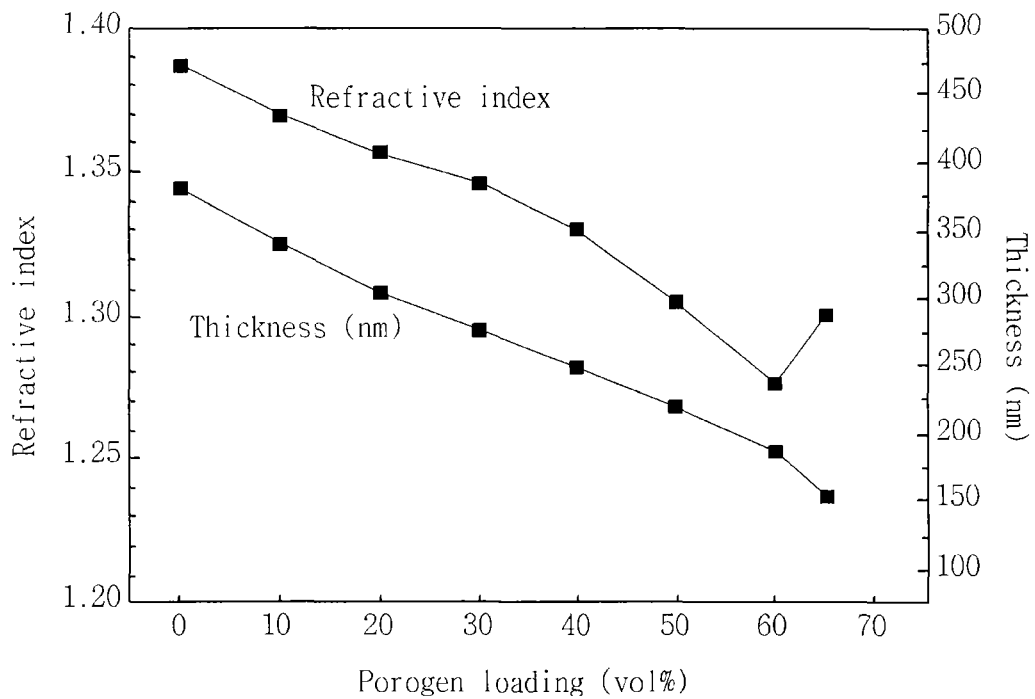
FIG. 1 shows reaction mechanisms that may occur when UV is irradiated during the manufacture of an ultralow dielectric film.
FIG. 2 is a graph showing the measurement of refractive index and thin film thickness as the porogen loading increases to 0 to 70% by volume in Example 1.

A method of preparing an ultralow dielectric film according to the present invention includes mixing a compound represented by Formula 1 and a poly alkyl silsesquioxane copolymer to form a thin film, heating the thin film, subjecting the thin film to heat treatment and irradiating UV onto the thin film during the heat treatment.

Hereinafter, the present invention will be described in detail by the following steps.

Thin Film Forming Step

The step is a step of putting a compound represented by Formula 1 and a poly alkyl silsesquioxane copolymer into an organic solvent to prepare a mixed solution and then coating the mixed solution on a substrate to form a thin film.

In the present invention, a compound represented by the following Formula 1 is used as a porogen.

$R_1OCH_2[CH(OR_2)]_nCH_2OR_3$            [Formula 1]

In the formula, $R_1$, $R_2$, and $R_3$ are each hydrogen or A, and one or more of $R_1$, $R_2$, and $R_3$ are A, wherein, A is $R_4Si(OR_5)_3$, $R_4$ and $R_5$ are each an alkyl group of a carbon number of 1 to 5, and n is an integer of 2 to 4.

The compound represented by Formula 1 is a compound in which one or more hydroxyl groups in a polyol of a carbon number of 4 to 6 are substituted by an alkyl alkoxy silane group. The polyol may employ a compound having 4 or more hydroxyl groups (OH), and more preferably 4 to 8 hydroxyl groups. The polyol may be one or more of erythritol, xylitol, and sorbitol, and most preferably xylitol.

An example of the compound represented by Formula 1 may be represented by the following Formula 2.

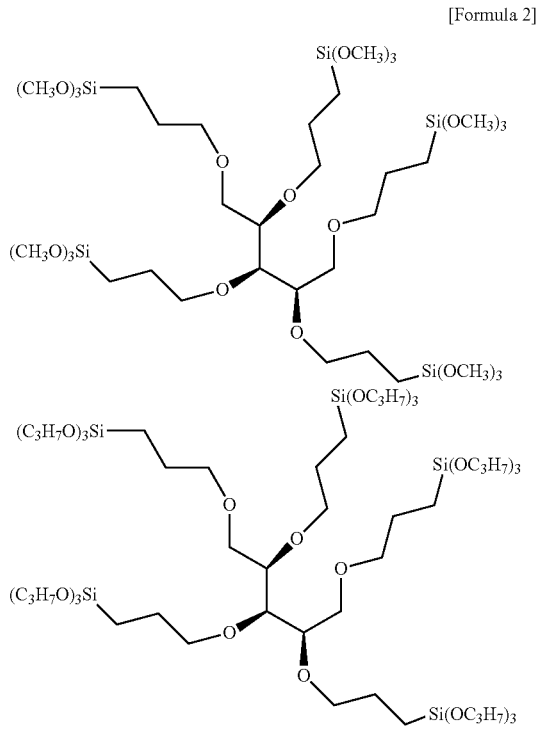

[Formula 2]

-continued

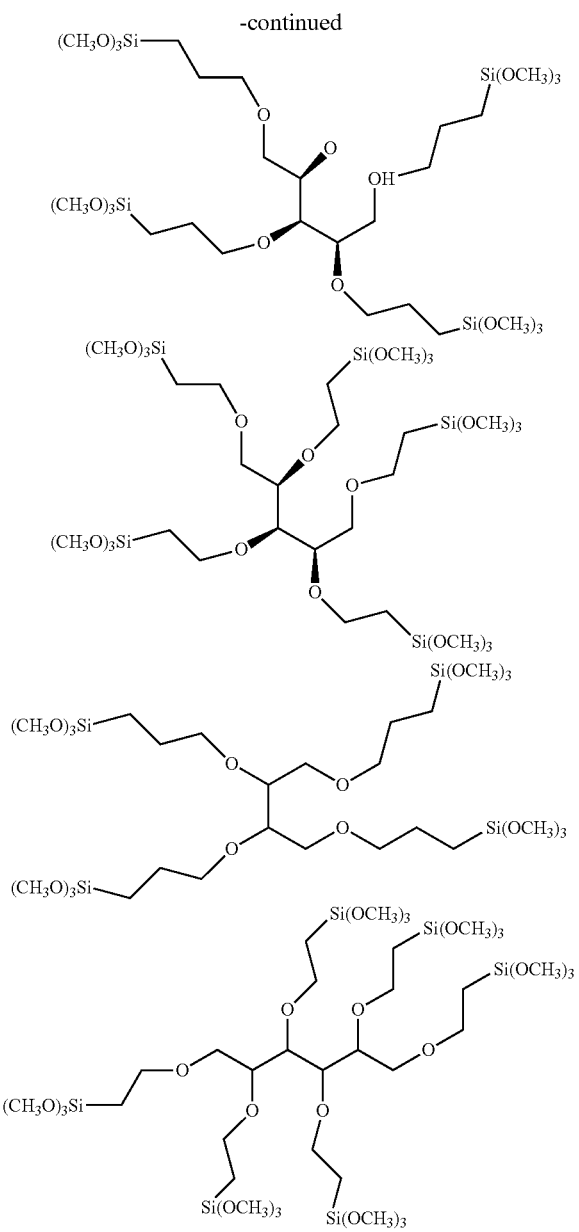

The compound represented by Formula 1 is a compound prepared by serially performing alkenylation and hydrosilylation reactions on a hydroxyl moiety of the polyol to convert the hydroxyl moiety into an alkyl alkoxy silane group for modification.

In the alkenylation reaction, the polyol is dissolved in a sodium hydroxide aqueous solution to induce a dehydration reaction, and then an akenyl compound such as a phase separation catalyst, alkenyl halide, etc., is added thereto to prepare a polyol derivative including an alkenyl group. In this case, an alkyl ammonium halide such as tetrabutyl ammonium bromide, etc., may be used as the phase separation catalyst. The alkenyl compound may be a compound having a carbon number of 1 to 6, and specific examples of the alkenyl compound may include vinyl halide, allyl halide, 1-butenyl halide, 1-pentenyl halide, and 1-hexenyl halide.

The hydrosilylation reaction is performed by a reaction of a polyol derivative in which an alkenyl group is introduced in the presence of a platinum catalyst with an alkoxy silane compound.

The present invention employs a poly alkyl silsesquioxane copolymer as a matrix of an ultralow dielectric film. The poly alkyl silsesquioxane copolymer may be a copolymer of methyl trimethoxy silane and α,ω-bis(trimethoxysilyl) ethane, or a copolymer of methyl trimethoxy silane and α,ω-bis(triethoxysilyl)ethane. A method of preparing the poly alkyl silsesquioxane copolymer is disclosed in Korean Patent Application Laid-Open No. 2002-38540.

The mixed solution may be prepared by dissolving the compound represented by Formula 1 and the poly alkyl silsesquioxane copolymer in an organic solvent at the same concentration in the range of 10 to 40% by weight, and then may be mixed at the ratio of the compound represented by Formula 1: the poly alkyl silsesquioxane copolymer of 10 to 70%:90 to 30% by volume, preferably at 20 to 70%:80 to 30% by volume, and most preferably at 30 to 60%:70 to 40% by volume.

It is difficult to form a thin film itself because permittivity is increased when the ratio is less than 10% and the mechanical strength is significantly decreased when the ratio is more than 70%. Further, when the porogen loading is 60% by volume or more, a collapse phenomenon of the pores formed in a thin film due to an increase in porogen loading may be induced to decrease the thickness of the thin film, and the porosity may be decreased to increase the refractive index. When the compound of Formula 1 as a porogen is present in a range of 30 to 60% by volume, low permittivity and high mechanical strength may be simultaneously implemented.

The mixed solution may be spin-coated on a substrate by using the method to obtain a thin film.

In this case, the organic solvent may include normal butanol, normal butyl acetate, dimethylformamide (DMF), dimethylacrylamide (DMA), dimethylsulfoxide (DMSO), etc. A substrate which is commonly used is employed, and a silicon wafer prepared by passing the solvent through a poly (tetrafluoroethylene) syringe filter (0.2 μm) may be used.

Heating Step

The heating step is a step of heating the thin film to a temperature of 200 to 300° C. The heating step is a step in which a condensation reaction among the poly alkyl silsesquioxane copolymers and a condensation reaction between the poly alkyl silsesquioxane copolymer and the compound represented by Formula 1 are performed to form organic and inorganic hybrids.

The residual solvent is removed by the heat, and a condensation reaction among the poly alkyl silsesquioxane copolymers and a condensation reaction between the compound of Formula 1 and the poly alkyl silsesquioxane copolymer occur to form organic and inorganic hybrids. More specifically, a pore domain (region) is produced in a matrix while the heating step is performed and simultaneously a nano phase separation occurs and thus organic-inorganic nanohybrids are formed.

Heat Treatment Step and UV Irradiation Step

The heat treatment step and the UV irradiation step are a step of subjecting the thin film to heat treatment after raising the thin film to 350 to 500° C., and a step of irradiating an ultraviolet (UV) ray at a wavelength of 200 to 300 nm onto the thin film for 5 to 30 min during the heat treatment.

In the steps, the condensation reaction initiated in the heating step is accelerated to form a Si reticular structure, and an organic material is removed from the compound of Formula 1 in the organic and inorganic hybrid structure to form pores in the thin film.

The temperature in the heating treatment step may be maintained at 350 to 500° C., and preferably at 400 to 450° C. The mechanical strength is the highest when the temperature is in the range of 400 to 450° C.

The heat treatment step may be performed by slowly raising the temperature from a temperature in the heating step at a rate of 1 to 10° C./min.

In the present invention, it was confirmed that the UV irradiation had effects on a silicon bonding structure in an ultralow dielectric film.

The bonding structure of silicon in silisesquioxane is largely classified into a network structure and a cage structure according to the type, number, and steric structure, etc., of the substituted element.

More specifically, the structure is classified into a Q structure (network structure, $SiO_2$) in which four oxygen atoms are bound around a silicon atom and a T structure (cage structure, $SiO_{1.5}$) in which three oxygen atoms are bound around a silicon atom. Each of the bonding structures had a big effect on properties of a film due to characteristics of the bond, and the network structure has a small binding angle and contributes to high refractive index and strong mechanical strength. The cage structure has relatively low refractive index and dielectric constant due to structural characteristics that the steric bond has, but a very low mechanical strength is shown, compared to the network structure. Therefore, it is an important factor for implementing excellent mechanical strength of an ultralow dielectric film in order to control the ratio between the network structure and the cage structure well.

The UV irradiation step is a step in which unreacted Si—OH and Si—C bonds are decomposed to form a Si network structure. More specifically, UV irradiation may have effects on the silicon bond caused by high energy, and the mechanical strength of the film may be significantly enhanced by generally providing influences on Si—OH and Si—C bonds to increase the relative ratio of a Si network structure having strong mechanical strength. A reaction mechanism that may occur when UV is irradiated is shown in FIG. 1.

A wavelength of 352 nm among UV wavelengths used in the present invention affects only the C—H bond while a wavelength of 254 nm affects both the Si—OH bond and the Si—C bond, and thus it is confirmed that the network structure is relatively improved as in the reaction in FIG. 1 to enhance the mechanical strength when a wavelength of 254 nm is irradiated. Further, the UV irradiation decomposes the O—H bonds of a small amount of unreacted Si—OH which are left behind after the heat treatment to assist in the condensation reaction and permittivity is shown to be reduced through decomposition and rearrangement of Si—C bonds.

Therefore, in the present invention, the C—C bond of a copolymerized w-bis triethoxysilyl ethane (Korean Patent No. 589123) is broken down in order to increase the strength of the matrix when a wavelength is less than 200 nm during the UV irradiation, while there is almost little effect on mechanical properties due to no effect on the bond (Si—C and Si—OH) related to the silicon atom when the wavelength is more than 300 nm (Comparative Example 1).

Further, when the time for UV irradiation is more than 30 min, the free volume in a dielectric film is reduced to increase permittivity, which is not preferable.

The UV irradiation step is a step in which the content of residual carbon is rapidly decreased by the reaction in FIG. 1, and the weight ratio of C and Si (C/Si) which are left behind in the thin film by the UV irradiation may be 0.7 to 0.8, and preferably 0.73 to 0.75.

Another exemplary embodiment of the present invention is to provide an ultralow dielectric film including pores in a matrix. The ultralow dielectric film uses a poly alkyl silsesquioxane copolymer as a matrix thereof, and the pores are formed by coating a mixed solution of a compound represented by the following Formula 1 and the poly alkyl silsesquioxane on a substrate and then subjecting the substrate to heat treatment to remove an organic material from the compound of Formula 1.

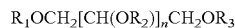  [Formula 1]

In the formula, $R_1$, $R_2$, and $R_3$ are each hydrogen or A, and one or more of $R_1$, $R_2$, and $R_3$ are A, wherein, A is $R_4Si(OR_5)_3$, $R_4$ and $R_5$ are each an alkyl group of a carbon number of 1 to 5, and n is an integer of 2 to 4.

The mixed solution may be prepared by dissolving the compound represented by Formula 1 and the poly alkyl silsesquioxane copolymer in an organic solvent at the same concentration in the range of 10 to 40% by weight, and then may be mixed at the ratio of the compound represented by Formula 1: the poly alkyl silsesquioxane copolymer of 10 to 70%:90 to 30% by volume, preferably at 20 to 70%:80 to 30% by volume, and most preferably at 30 to 60%:70 to 40% by volume.

The ultralow dielectric film may be formed by coating the mixed solution on a substrate, curing the substrate at a temperature of 200 to 300° C., and subsequently irradiating a UV ray at a wavelength of 200 to 300 nm onto the substrate for 5 to 30 min during a heat treatment at 400 to 450° C.

The ultralow dielectric film may have pores of 1 to 3 nm or less, and a void fraction of 10 to 30%.

The ultralow dielectric film may have a mechanical elastic modulus of 10.5 to 19 GPa and permittivity of 2.4 to 2.12. The ultralow dielectric film may increase the elastic modulus up to 19 GPa.

The ultralow dielectric film may have a weight ratio of C and Si (C/Si) which are left behind in the thin film, 0.7 to 0.8, and preferably 0.73 to 0.75.

The mechanical strength of the film may be significantly enhanced by providing influences on Si—OH and Si—C bonds through the UV irradiation to increase the relative ratio of a Si—O—Si network structure having a strong mechanical strength.

According to yet another exemplary embodiment, the present invention provides a porogen for forming an ultralow dielectric film capable of a sol-gel reaction with a poly alkyl silsesquioxane copolymer. The porogen is represented by the following Formula 1 and pores are formed by dissolving the porogen and the poly alkyl silsesquioxane copolymer in an organic solvent at the same concentration in the range of 10 to 40% by weight, and mixing the solution at the ratio of the compound represented by Formula 1: the poly alkyl silsesquioxane copolymer of 10 to 70%:90 to 30% by volume, coating the solution, and performing a heat treatment to remove an organic material from the porogen.

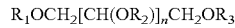  [Formula 1]

In the formula, $R_1$, $R_2$, and $R_3$ are each hydrogen or A, and one or more of $R_1$, $R_2$, and $R_3$ are A, wherein, A is $R_4Si(OR_5)_3$, $R_4$ and $R_5$ are each an alkyl group of a carbon number of 1 to 5, and n is an integer of 2 to 4.

The porogen described above may be used as the porogen.

According to still another exemplary embodiment, the present invention provides a composition for forming an ultralow dielectric film, including a poly alkyl silsesquioxane copolymer as a matrix and a porogen represented by the following Formula 1. The composition includes a mixture formed by dissolving the compound represented by Formula 1 and the poly alkyl silsesquioxane copolymer in an organic solvent at the same concentration in the range of 10 to 40% by weight, and mixing the solution at the ratio of the compound represented by Formula 1: the poly alkyl silsesquioxane copolymer of 10 to 70%:90 to 30% by volume.

$$R_1OCH_2[CH(OR_2)]_nCH_2OR_3 \quad\quad \text{[Formula 1]}$$

In the formula, $R_1$, $R_2$, and $R_3$ are each hydrogen or A, and one or more of $R_1$, $R_2$, and $R_3$ are A, wherein, A is $R_4Si(OR_5)_3$, $R_4$ and $R_5$ are each an alkyl group of a carbon number of 1 to 5, and n is an integer of 2 to 4.

The composition ration may include preferably 30 to 60%: 70 to 40% by weight after dissolving the compound represented by Formula 1 and the poly alkyl silsesquioxane copolymer in an organic solvent at the same concentration in the range of 10 to 40% by weight.

Components constituting the composition have been described above, and thus an explanation thereof will be omitted.

According to still yet another exemplary embodiment, the present invention provides an electronic device including the ultralow dielectric film. The electronic device may be one or more selected from the group consisting of a non-memory semiconductor device, a memory semiconductor device, an antireflection film, a central processing unit (CPU), a system-on-chip, and a display device.

Besides the known non-memory semiconductor device, memory semiconductor device, antireflection film, central processing unit (CPU), system-on-chip, or display device which are provided as an example of the electronic device, electronic devices in which the ultralow dielectric film of the present invention may be used are included within the scope of the present invention.

Hereinafter, the present invention will be described in more detail with reference to the following Examples. However, these Examples should not be construed as limiting the scope of the present invention in any manner.

[Manufacture of Ultralow Dielectric Film Using Reactive Porogen and UV Curing Method]

Example 1

A polymethylsilsesquioxane precursor (GR650FTM, Si—OH/Si atomic ratio=9%) as a matrix component, or 1-methoxy-2-propanol acetate solvent as a polymethylsilsesquioxane copolymer was used to prepare a solution at a concentration of 20% by weight. The polymethylsilsequioxane copolymer is disclosed in Korean Patent No. 589123, and a copolymer, in which methyltrimethoxysilane and α,ω-bistriethoxysilylethane are copolymerized at a molar ratio of 75:25, was used. As a template for forming pores, a compound, in which the whole hydroxyl group of xylitol is substituted with a propyltrimethoxy silyl group, was prepared at a concentration of 20% by weight. The compound is disclosed in Korean Patent No. 672905, and an ultralow dielectric thin film was prepared by changing the volume ratio of the template solution prepared into 0, 30, and 60% by volume.

As a specific preparation process, each of the matrix component and the template was first dissolved in 1-methoxy-2-propanol acetate solvent and mixed together to prepare an organic-inorganic mixed solution.

The organic-inorganic mixed solution was passed through a poly(tetrafluoroethylene) (PTFE) syringe filter (0.2 μm), the organic-inorganic mixed solution was applied dropwise onto a silicon wafer, and then the silicon wafer was spin-coated at a rate of 2500 rpm for 30 sec to prepare a thin film.

The thin film thus prepared was heated to a temperature of 250° C. to remove the solvent and induce a condensation reaction in the matrix, again subjected to heat treatment at 430° C. for 1 hour, again. A light source with a wavelength of 254 nm was fixed at an intensity of 7 mW/cm², and an ultraviolet ray was irradiated at a high temperature of 430° C. for 5, 10, and 30 min to prepare a nanoporous thin film.

Comparative Example 1

An ultralow dielectric film including nanopores was prepared by the method in Example 1, while an ultraviolet light source with a wavelength of 352 nm was irradiated for 30 min.

Comparative Example 2

An ultralow dielectric thin film including nanopores was prepared by the method in Example 1, while only a heat treatment was used instead of using the UV irradiation.

Test Example

Measurement of Properties of Thin Film (1) Refractive Index and Thickness of Thin Film
The refractive index and thickness of the thin film were measured at a wavelength of 632.8 nm by using a film matrix (F-20, Filmetrics, Inc.) and the results were shown in Table 1.
(2) Void Fraction of Thin Film
Porosity was calculated by using Lorentz-Lorentz equation represented by the following Mathematical Formula 1, and the result is shown in Table 1.

$$\frac{n_0^2 - 1}{n_0^2 + 2}(1 - P) = \frac{n^2 - 1}{n^2 + 2} \quad\quad \text{[Mathematical Formula 1]}$$

In the Mathematical Formula 1, no and n indicate the refractive indices of porous and non-porous films, respectively, and P indicates the porosity.
(3) Void Fraction of Thin Film
A silicon wafer (0.005 Ω·cm) having very high conductivity was used as a bottom electrode, an ultralow dielectric thin film was vacuum deposited thereon, and an aluminum electrode having a diameter of about 1 mm was sequentially vacuum deposited onto the thin film. From the sample thus prepared, capacitance was measured at 1 MHz by using an HP 4284A impedance analyzer, permittivity was calculated by considering the thickness and electrode area of the thin film, which is already known, and the results were shown in Table 1.
(4) Elastic Modulus (E) and Surface Hardness (H) of Thin Film
The elastic modulus (E) and surface hardness (H) of the thin film were measured through nanoindentation experiments (Nanoindenter XP, MTS Corp.).
This is a method of measuring the elastic modulus and surface hardness of a thin film by indenting the thin film into a depth of 1 μm or less with a sharp indenter under a very low loading. Each of the elastic modulus and surface hardness was measured considering the matrix effects, and when each of the measured values was lowest, the value was taken as the properties of the thin film. The measured elastic modulus and surface hardness are shown in Table 1.
(5) Comparison of C/Si content of Thin Film
A quantitative analysis of carbon and silicon atoms in a thin film was performed by using X-ray Photoelectron Spectroscopy. When a photon (X-ray) having predetermined energy is irradiated onto a sample, photo electrons are emitted from the sample, and thus a binding energy for emitting a photo electron from the sample may be found when kinetic energy of these photo electrons is measured. Since the binding energy is one of the inherent properties of atoms, atomic analysis and surface concentration of elements may be measured by measuring binding energy. The C/Si contents were calculated from the amounts of carbon and silicon atoms which were quantitatively analyzed, and shown in Table 2.

Figure 3:
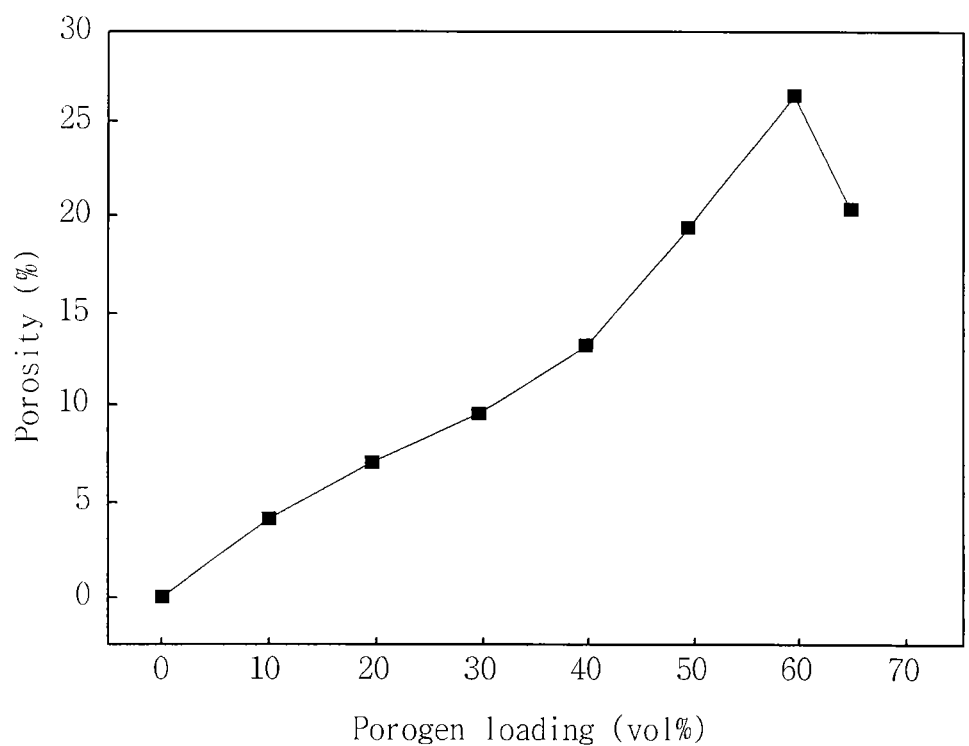
FIG. 3 is a graph showing the measurement of porosity as the porogen loading increases to 0 to 70% by volume in Example 1.

(6) Measurement of Refractive Index, Thin Film Thickness, and Porosity According to Content of Porogen An ultralow dielectric film including nanopores was prepared by the method in Example 1, the refractive index, thin film thickness, and porosity were measured by increasing the content of the porogen from 0% by volume to 70% by volume, and the results are shown in FIGS. 2 and 3.

Figure 4:
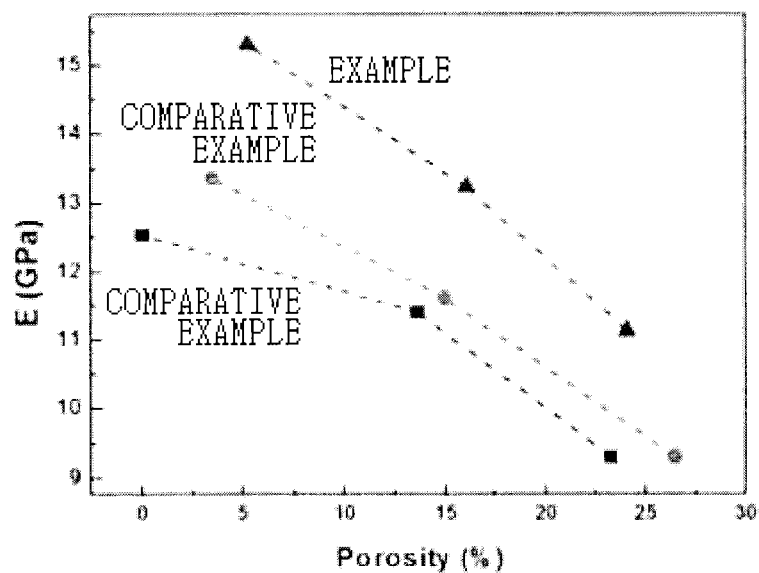
FIG. 4 is a graph showing the changes of mechanical properties (elastic modulus) as the porosity changes in thin films prepared in Example 1 (254 nm, 30 min), Comparative Example 1 (352 nm, 30 min), and Comparative Example 2.
Figure 5:
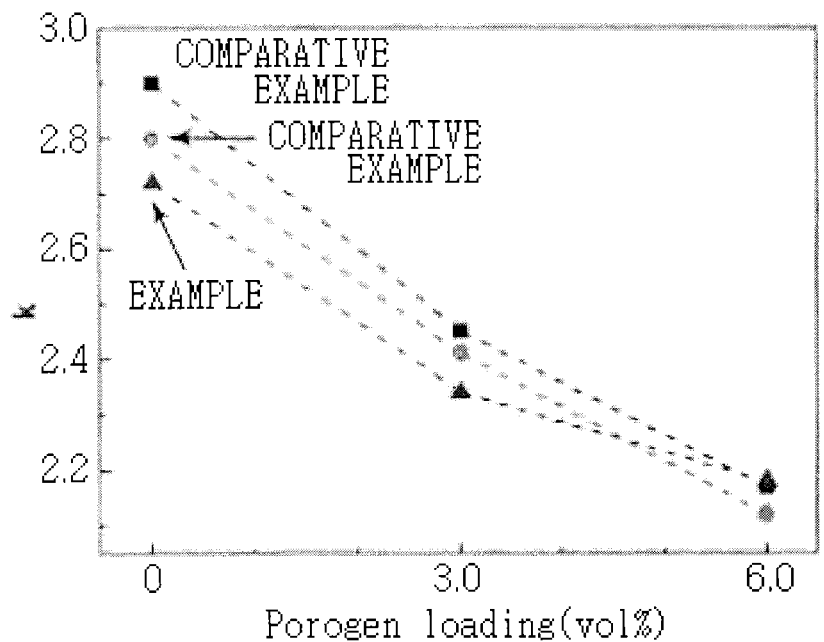
FIG. 5 is a graph showing the changes of permittivity as the pore-forming template (TMSXT) loading changes in thin films prepared in Example 1 (254 nm, 30 min), Comparative Example 1 (352 nm, 30 min), and Comparative Example 2.

FIG. 4 is a graph showing the changes of mechanical properties (elastic modulus) as the porosity (P) changes in thin films prepared in Example 1 (254 nm, 30 min), Comparative Example 1 (352 nm, 30 min), and Comparative Example 2, and FIG. 5 is a graph showing the changes of permittivity as the porogen (TMSXT) loading changes in thin films prepared in Example 1 (254 nm, 30 min), Comparative Example 1 (352 nm, 30 min), and Comparative Example 2.

However, when the porogen loading was more than 60% by volume as in FIGS. 2 and 3, the degree of reduction in thickness of the thin film rapidly increased and the refractive index increased, and it was also determined that the porosity decreased even though the porogen loading increased. Further, when the porogen loading was 70%, it was difficult to form a thin film itself, and thus the refractive index, permittivity, etc., could not be measured.

It was determined through Table 1 and FIGS. 2 and 3 that a collapse phenomenon of pores formed in a thin film due to an increase in the porogen loading may be induced to decrease the thickness of the thin film and the porosity may be decreased to increase the refractive index when the porogen loading is 60% by volume or more. Thus, as the porogen loading increases, the dielectric constant decreases when the porogen loading is in the range of 0 to 60% by volume, while the dielectric constant decreases when the porogen loading is more than 60% by volume.

Referring to FIG. 4, it was confirmed that an elastic modulus for the porosity (P) in Example 1 was relatively higher than those in Comparative Examples 1 and 2. Referring to

TABLE 1

| Classification | Porogen (% by volume) | Time for UV irradiation (min) | Permittivity n | Porosity P (%) | Dielectric Constant k | Elastic Modulus E (GPa) | Hardness H (GPa) |
| --- | --- | --- | --- | --- | --- | --- | --- |
| Example 1 (UV 254 nm) | 0 | 5 | 1.3794 | 4.16 | 2.75 | 15.21 | 2.20 |
| | 30 | | 1.3289 | 15.72 | 2.39 | 12.94 | 1.74 |
| | 60 | | 1.2912 | 24.61 | 2.16 | 10.74 | 1.21 |
| | 0 | 10 | 1.3723 | 5.76 | 2.70 | 15.37 | 2.30 |
| | 30 | | 1.3303 | 15.40 | 2.40 | 12.90 | 1.78 |
| | 60 | | 1.2915 | 24.54 | 2.16 | 10.77 | 1.24 |
| | 0 | 30 | 1.3747 | 5.22 | 2.72 | 15.31 | 2.42 |
| | 30 | | 1.3275 | 16.05 | 2.34 | 13.24 | 1.78 |
| | 60 | | 1.2935 | 24.06 | 2.18 | 11.13 | 1.29 |
| Comparative Example 1 (UV 352 nm) | 0 | 30 | 1.3825 | 3.46 | 2.80 | 13.36 | 2.10 |
| | 30 | | 1.3321 | 14.98 | 2.41 | 11.60 | 1.63 |
| | 60 | | 1.2834 | 26.48 | 2.12 | 9.30 | 1.10 |
| Comparative Example 2 (non UV) | 0 | 0 | 1.3980 | 0 | 2.90 | 12.53 | 1.98 |
| | 30 | | 1.3380 | 13.61 | 2.45 | 11.40 | 1.52 |
| | 60 | | 1.2926 | 23.28 | 2.17 | 9.30 | 1.10 |

TABLE 2

| Classification | Porogen (% by volume) | C/Si |
| --- | --- | --- |
| Example 1 (UV) | 0 | 0.795 |
| Example 1 (UV) | 10 | 0.806 |
| Example 1 (UV) | 20 | 0.790 |
| Example 1 (UV) | 30 | 0.734 |
| Example 1 (UV) | 60 | 0.741 |
| Comparative Example 2 (non UV) | 0 | 0.983 |
| Comparative Example 2 (non UV) | 10 | 0.914 |
| Comparative Example 2 (non UV) | 20 | 0.865 |
| Comparative Exasmple 2 (non UV) | 30 | 0.768 |
| Comparative Example 2 (non UV) | 60 | 0.760 |

Referring to Table 1 and FIGS. 2 to 5, it was determined that the permittivity decreased, the porosity increased, and the elastic modulus decreased as the porogen loading increased.

FIG. 5, it was confirmed that permittivity according to the porogen loading in the Example was relatively lower than those in Comparative Examples 1 and 2.

Referring to Table 2, it was confirmed that the weight ratio of C:Si (C/Si) in Example 1 was significantly decreased, compared to that in Comparative Example 2.

What is claimed is:

1. A method of preparing an ultralow dielectric film, comprising:
putting a compound represented by the following Formula 1 and a poly alkyl silsesquioxane copolymer into an organic solvent to prepare a mixed solution and then coating the mixed solution on a substrate to form a thin film;
heating the thin film to 200 to 300° C.; and
subjecting the thin film to heat treatment after raising the thin film to 350 to 500° C. and irradiating an ultraviolet (UV) ray at a wavelength of 200 to 300 nm onto the thin film for 5 to 30 min during the heat treatment:

[Formula 1]

wherein $R_1$, $R_2$, and $R_3$ are each hydrogen or A, and one or more of $R_1$, $R_2$, and $R_3$ are A, wherein, A is $R_4Si(OR_5)_3$, $R_4$ and $R_5$ are each an alkyl group of a carbon number of 1 to 5, and n is an integer of 2 to 4.

2. The method according to claim 1, wherein a condensation reaction among the poly alkyl silsesquioxane copolymers and a condensation reaction between the poly alkyl silsesquioxane copolymer and the compound represented by Formula 1 are performed in the heating step to form organic and inorganic hybrids.

3. The method according to claim 2, wherein the heat treating and the UV irradiating are steps in which the condensation reaction is accelerated to form a Si network structure and an organic material is removed from the compound of Formula 1 in the organic and inorganic hybrid structure to form pores in the thin film.

4. The method according to claim 1, wherein the heating treating is performed at 400 to 500° C.

5. The method according to claim 1, wherein the UV irradiating is a step in which unreacted Si—OH and Si—C bonds are decomposed to form a Si network structure.

6. The method according to claim 5, wherein the UV irradiating is a step in which a content of residual carbon is decreased, and the weight ratio of C and Si (C/Si) which are left behind in the thin film is 0.7 to 0.8 by the UV irradiation.

7. The method according to claim 1, wherein the compound represented by Formula 1 is selected from the group represented by the following Formula 2.

[Formula 2]

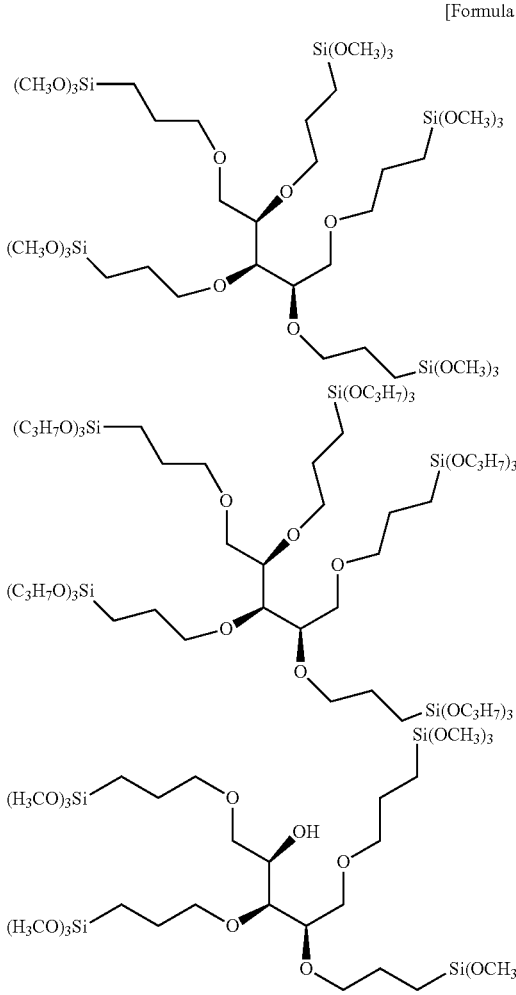

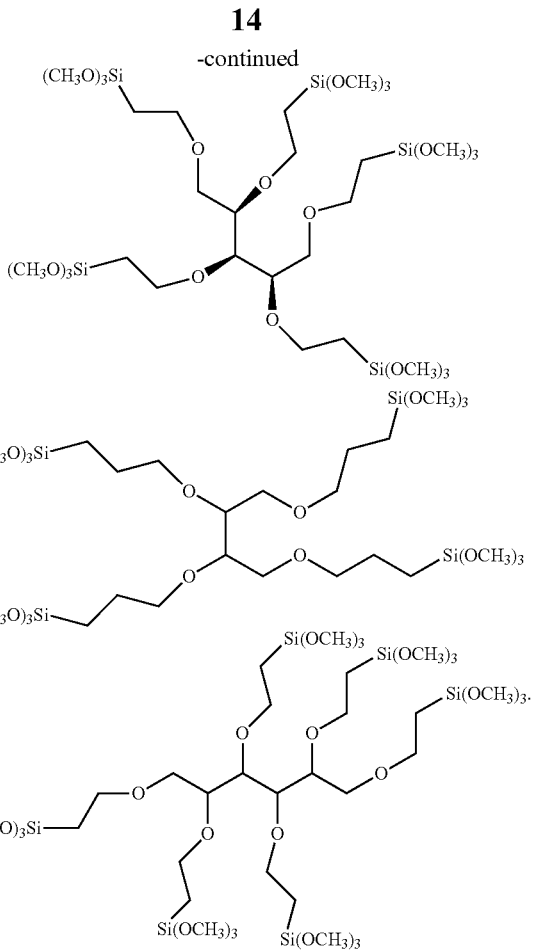

8. The method according to claim 1, wherein the mixed solution is prepared by dissolving the compound represented by Formula 1 and the poly alkyl silsesquioxane copolymer in an organic solvent at the same concentration in a range of 10 to 40% by weight, and then being mixed at a ratio of the compound represented by Formula 1: the poly alkyl silsesquioxane copolymer of 10 to 70%:90 to 30% by volume.

9. The method according to claim 1, wherein the poly alkyl silsesquioxane copolymer is a copolymer of methyl trimethoxy silane and α,ω-bis(trimethoxysilyl)ethane, or a copolymer of methyl trimethoxy silane and α,ω-bis(triethoxysilyl)ethane.

10. An electronic device comprising the ultralow dielectric film according to claim 1, wherein the electronic device comprises one or more selected from the group consisting of a non-memory semiconductor device, an antireflection film, a central processing unit (CPU), a system-on-chip, and a display device.

11. An ultralow dielectric film, comprising pores in a matrix, wherein a poly alkyl silsesquioxane copolymer is used as the matrix of the ultralow dielectric film and the pores are formed by coating a mixed solution of a compound represented by the following Formula 1 and the poly alkyl silsesquioxane on a substrate and then subjecting the substrate to heat treatment to remove an organic material from the compound of Formula 1:

[Formula 1]

wherein $R_1$, $R_2$, and $R_3$ are each hydrogen or A, and one or more of $R_1$, $R_2$, and $R_3$ are A, wherein, A is $R_4Si(OR_5)_3$, R₄ and R₅ are each an alkyl group of a carbon number of 1 to 5, and n is an integer of 2 to 4.

12. The ultralow dielectric film according to claim 11, wherein the mixed solution is prepared by dissolving the compound represented by Formula 1 and the poly alkyl silsesquioxane copolymer in an organic solvent at the same concentration in a range of 10 to 40% by weight, and then being mixed at a ratio of the compound represented by Formula 1: the poly alkyl silsesquioxane copolymer of 10 to 70%:90 to 30% by volume.

13. The ultralow dielectric film according to claim 11, wherein the ultralow dielectric film is formed by coating the mixed solution on a substrate, curing the substrate at a temperature of 200 to 300° C., and subsequently irradiating a UV ray at a wavelength of 200 to 300 nm to the substrate for 5 to 30 min during a heat treatment at 400 to 450° C.

14. The ultralow dielectric film according to claim 11, wherein the ultralow dielectric film has pores of 1 to 3 nm or less and a porosity of 10 to 30%.

15. The ultralow dielectric film according to claim 11, wherein the ultralow dielectric film has an elastic modulus of 10.5 to 19 GPa and a permittivity of 2.4 to 2.12.

16. The ultralow dielectric film according to claim 11, wherein the ultralow dielectric film has a weight ratio of C and Si, which are left behind in the thin film, of 0.7 to 0.8.

17. A porogen for forming an ultralow dielectric film capable of a sol-gel reaction with a poly alkyl silsesquioxane copolymer, wherein the porogen is represented by the following Formula 1 and pores are formed by dissolving the porogen and the poly alkyl silsesquioxane copolymer in an organic solvent at the same concentration in a range of 10 to 40% by weight, and mixing the solution at the ratio of the compound represented by Formula 1: the poly alkyl silsesquioxane copolymer of 10 to 70%:90 to 30% by volume, coating the solution, and performing a heat treatment to remove an organic material from the porogen:

$$R_1OCH_2[CH(OR_2)]_nCH_2OR_3 \qquad \text{[Formula 1]}$$

wherein $R_1$, $R_2$, and $R_3$ are each hydrogen or A, and one or more of $R_1$, $R_2$, and $R_3$ are A, wherein, A is $R_4Si(OR_5)_3$, $R_4$ and $R_5$ are each an alkyl group of a carbon number of 1 to 5, and n is an integer of 2 to 4.

18. A composition for forming an ultralow dielectric film, comprising a poly alkyl silsesquioxane copolymer as a matrix and a porogen represented by the following Formula 1, wherein the composition comprises a mixture formed by dissolving the compound represented by Formula 1 and the poly alkyl silsesquioxane copolymer in an organic solvent at the same concentration in a range of 10 to 40% by weight, and mixing the solution at a ratio of the compound represented by Formula 1: the poly alkyl silsesquioxane copolymer of 10 to 70%:90 to 30% by volume:

$$R_1OCH_2[CH(OR_2)]_nCH_2OR_3 \qquad \text{[Formula 1]}$$

wherein $R_1$, $R_2$, and $R_3$ are each hydrogen or A, and one or more of $R_1$, $R_2$, and $R_3$ are A, wherein, A is $R_4Si(OR_5)_3$, $R_4$ and $R_5$ are each an alkyl group of a carbon number of 1 to 5, and n is an integer of 2 to 4.

* * * * *